US007897187B2

(12) United States Patent
Thelen

(10) Patent No.: US 7,897,187 B2
(45) Date of Patent: Mar. 1, 2011

(54) BASE MATERIAL FOR PRODUCING FOOD AND FODDER

(75) Inventor: Alois Thelen, Baesweiler (DE)

(73) Assignee: GET - Internationale GmbH, Baesweiler (DE)

( * ) Notice: Subject to any disclaimer, the term of this patent is extended or adjusted under 35 U.S.C. 154(b) by 244 days.

(21) Appl. No.: 12/095,321

(22) PCT Filed: Nov. 23, 2006

(86) PCT No.: PCT/EP2006/068857

§ 371 (c)(1), (2), (4) Date: Sep. 11, 2008

(87) PCT Pub. No.: WO2007/063034

PCT Pub. Date: Jun. 7, 2007

(65) Prior Publication Data

US 2009/0221719 A1 Sep. 3, 2009

(30) Foreign Application Priority Data

Nov. 29, 2005 (DE) ........................ 10 2006 057 252
Jan. 16, 2006 (DE) ........................ 10 2006 002 220
Apr. 5, 2006 (DE) ........................ 10 2006 016 353

(51) Int. Cl.
*A23B 7/16* (2006.01)
*A23L 2/56* (2006.01)
*A23L 1/236* (2006.01)
*A23L 1/238* (2006.01)
*A21D 13/00* (2006.01)

(52) U.S. Cl. ........... 426/68; 426/533; 426/548; 426/549; 426/589

(58) Field of Classification Search .................... 426/68, 426/533, 548, 549, 589
See application file for complete search history.

(56) References Cited

U.S. PATENT DOCUMENTS 3,718,484 A 2/1973 Glabe
4,465,702 A 8/1984 Eastman et al.
4,575,461 A 3/1986 Friedman et al.
5,376,399 A 12/1994 Dreese et al.
5,711,975 A 1/1998 Gonze et al.
2002/0090446 A1 7/2002 Jeffcoat et al.

FOREIGN PATENT DOCUMENTS

DE 40 04 733 A1 8/1991
EP 0 266 885 A1 5/1988
EP 0 609 983 A2 8/1994
WO 93 06752 A 4/1993
WO 2004 049822 A 6/2004

*Primary Examiner* — Raymond J Henley, III
(74) *Attorney, Agent, or Firm* — Norris McLaughlin & Marcus, P.A.

(57) ABSTRACT

The invention relates to a material consisting of a powder selected from a thickening means and lecithin powder, and syrup. Said material is especially suitable for producing food and fodder. The invention also relates to a method for producing said material, to the use of said material, and to products consisting of the same.

14 Claims, No Drawings

BASE MATERIAL FOR PRODUCING FOOD AND FODDER

This application is a 371 of PCT/EP2006/068857, filed Nov. 23, 2006, which claims foreign priority benefit under 35 U.S.C. §119 of the German Patent Application Nos. 10 2005 057 252.9, filed Nov. 29, 2005, 10 2006 002 220.3, filed Jan. 16, 2006, and 10 2006 016 353.2 filed Apr. 5, 2006.

The present invention relates to a material consisting of a powder selected from a thickening agent and lecithin powder ("powder"), and a syrup. It is suitable, in particular, for producing food and fodder. The invention further relates to a process for producing said material, the use of said material, and products obtained from said material.

BACKGROUND

In the preparation of foods, base materials, which may account for a significant fraction of the finished food, are frequently employed. Such base materials are often prefabricated mixes (such as baking mixes, but also marzipan paste, flavor mixes etc.), which must be selected to match the individual finished food and stored in accordance with their respective properties.

Known prefabricated mixes as base materials for foods often have the following drawbacks: On the one hand, they have a limited storage life, especially after the package has been opened. This has an effect, in particular, on remainders of stock, which are not only perishable, but also attract vermin. In addition, bacteria and other microorganisms, such as Salmonella, can colonize and prosper on or in the mixture. This results in health risks.

Further, such mixtures are often sensitive towards temperature variations and are frequently tedious to handle. The tedious to handle property results from the fact that such mixes are either sticky or, when in powder form, tend to form dust and/or lumps. Therefore, the correct dosing and further processing are difficult.

Three components that can be found today in most foods are starch flour or other thickening agents, lecithin and sugar (or sugar substitutes). All these components are powdery in their pure form. Thus, if one wants to offer these components as part of a prefabricated mix, one encounters all the difficulties inherent to powder-powder mixtures. Among others, the individual components of such mixtures will segregate due to gravity, so that different mixing ratios can form within one package (for illustration: a mixture of flour and sugar). For this reason, an always equal dosage in further processing is almost impossible. In addition, powders make dust when filled and weighed.

On the other hand, if one wants to use the three components mentioned in prefabricated mixes that also contain liquid or paste-like components, the effects of gravity are to be feared in such mixes as well: upon storage, the ingredients may settle and thus segregate or form gradients. In addition, physicochemical effects are possible in such mixtures, for example, the segregation of oils and fats and the crystallization of sugar or sugar substitutes, such as isomalt. Finally, such mixtures are often sticky and/or lumpy and therefore are difficult to dose. In addition, such mixtures, if containing crystal sugar, have a rather limited storage life.

It is just the use of starch flour or the increase of the previously achievable proportion of starch flour that is desired in many foods and food supplements. Among other reasons, starch is an important energy supplier which in addition is more digestible than merely starch-containing food components, such as cereal flour. In addition, starch does not have the allergenic potential of cereal flour.

Especially in bakery products, mainly in pastry with a fluffy paste, such as batter cake, a high starch proportion is desirable. This is because starch flours will bind the high moisture content in batters during the baking process due to their good agglutination properties. When conventional flour is used, the effect of the gluten contained in the flour must be accepted along with the desired starch properties. For this reason, flour tends to render a batter tough. This toughness can hardly be overcome by incorporating air by whipping. Therefore, part of the flour is traditionally replaced by pure starch flour in batters for fluffy pastry. Starch flour renders the crumb of the bakery products fine-pore, tender and short, but renders it dry when used in excess (Büskens, H., Backschule, ISBN 37736 2252 X, 3rd Edition, 1972, p. 173). The latter is why bakers have refrained to date from replacing the whole flour in bakery products by starch flour.

Although starch-containing sugar compositions are prepared in DE-A-4004733, this is done only under increased pressure and at elevated temperature. This requires a high expenditure in terms of machines and systems for controlling pressure and temperature, i.e., involves considerable drawbacks.

Thickening agents other than starch, for example, guar gum, also have been used to a limited extent in foods, although having numerous advantages. Thus, guar gum promotes the viscosity and softness of batters and pastries and thus renders the use of artificial additives, such as sorbitol, superfluous.

Base materials are also frequently employed in the preparation of fodders. These base materials are similar to the base materials for food preparation and must meet the same requirements as set forth above. Starch flour and other thickening agents, lecithin and sugar (or sugar substitutes) are indispensable components in fodder preparation, especially in many concentrated feeds and high starch fodders. In addition, the need for dietetic feeds with sugar substitutes is growing higher especially in pet keeping.

Thus, it is the object of the invention to provide a base material which overcomes the above mentioned drawbacks of the prior art. In particular, it is intended that no segregation of individual components occurs in this base material, it is to be readily dosed and processed, and it is to be suitable for combination with most of the usual foods or food components, or form a base for foods. The latter also applies to fodders instead of foods.

SUMMARY OF THE INVENTION

This object is achieved by a base material consisting of two main components, namely a powder selected from thickening agents (especially starch flour) and lecithin powder, and a syrup, preferably glucose or fructose syrup. This base material is readily prepared, simply handled, has a long storage life and a wide variety of applications.

Thus, the present invention relates to:

(1) a base material, especially for producing foods, essentially consisting of (i) a powder selected from a thickening agent, lecithin powder, a mixture of several thickening agents and a mixture of one or several thickening agents with lecithin (referred to as "powder" in the following), and (ii) a syrup or a mixture of different syrups;

(2) the use of the base material as defined under (1) for producing foods, food supplements, food precursors, fodders, fodder supplements, fodder precursors, pharmaceuticals, veterinary medicaments or cosmetics, preferably for producing fodders, fodder precursors, foods or food precursors, more preferably for producing foods or food precursors;

(3) a process for producing the base material as defined under (1), comprising the steps of:

(i) combining the powder and the syrup; and (ii) mixing, preferably kneading, the mixture, preferably at room temperature, until a homogeneous composition is obtained; and (4) a product consisting of at least 50% by weight of the base material according to (1).

DEFINITIONS

The terms “foods” and “foodstuffs” are used interchangeably in the context of the present invention. They refer to the food of humans. Foods are all materials or products designated to, or reasonably expected to, be taken up by humans in a processed, partially processed or unprocessed state. Foods also include beverages and sweets.

“Fodders” ate all kinds of food for animals kept by humans (i.e., domestic animals and pets). In the context of the present invention, the term “fodder” includes different kinds of fodder, for example, fodder for farm animals, pet food and specialized food for sporting horses.

“Thickening agents” are usually added to emulsions, suspensions and aqueous solutions to provide them with more viscosity or solidify them. Thickening agents build a network that binds liquid. Many thickening agents are linear or branched macromolecules, e.g., polysaccharides or proteins that are fixed within the matrix by intermolecular interactions, such as hydrogen bonds or ionic bonds. Thickening agents are used, inter alia, in foods and cosmetics. In food production, the following thickening agents are frequently employed: starch flour, gelatin, alginate, agar (E 406), carrageenan, (E 407), locust bean gum (E 410), guar gum (E 412), tragacanth (E 413), xanthan gum (E 415), karaya gum (E 416), tara gum (E 417), gellan gum (E 418), pectin (E 440), cellulose (E 460) and cellulose ether. In pharmacy and cosmetics, thickening agents are also used, in addition to gels and lotions, as a component of tablets that swell in the stomach or intestine thereby and thus can more readily release the active ingredient. In the context of the present invention, the term “thickening agent” relates to any known powdery thickening agents, preferably starch flour.

“Starch flour” (aka starch) is a fine white powder that is usually used for the thickening of foods. It becomes transparent during cooking and is tasteless. Under the action of heat, starch can physically bind a multiple of its own weight of water, swell and agglutinate. When heated with water, the starch will swell at 47-57° C., the layers crack up, and at 55-87° C. (potato starch at 62.5° C., wheat starch at 67.5° C.), starch glue forms, having a different stiffening capacity depending on the starch type. Agglutinated starch and coagulated gluten form the base structure of all kinds of pastry. Starch will swell less upon heating, but predominantly upon cooling. The most important starch sources for thickening agents are cereals, mainly wheat, rice, corn, potatoes, tapioca, sago, arrowroot and soybean. Corn starch, which is the most widely employed starch, is mainly used for sweet sauces, custards and Asian dishes. Potato starch has a wide variety of uses and binds liquids already far below its boiling point. Tapioka, the starch from the roots of cassaya (manioc) shrub, and sago, an extract from the pith of the Indian sago palm, are also used for the thickening of sauces, fruit soups, custard and jelly. Arrowroot is employed in fruit jellies, sauces and desserts. Like flour, starch flour is usually stirred always in cold liquid initially, added into the boiling food with constant stirring and boiled for about 2 minutes before taking it from the cooking place.

“Sugar substitutes” are sweet tasting carbohydrates that have no influence on the blood glucose level. They have an energy content of at most 2.4 kcal/g (corresponds to the EU maximum limit). Therefore, they are used in dietetic foods and are also employed in toothpaste, tooth-care chewing gums etc., because they have no cariogenic effect. Their relative sweetness is similar to the sweetness of saccharose. They are mostly recovered from fruits or vegetables. Sugar substitutes are different sugar alcohols (sorbitol, mannitol, isomalt, maltitol, maltitol syrup, lactitol, xylitol) and fructose. In the context of the present invention, isomalt, maltitol (E 965), maltitol syrup and fructose are the preferred sugar substitutes, where maltitol and the sugar substitutes that can be prepared from maltitol, especially maltitol syrup and isomalt, are more preferred.

“Syrup” is a highly viscous concentrated solution of a sugar or sugar substitute obtained from sugar-containing liquids, such as sugar water, liquids containing sugar substitute, sugar beet juice, fruit juices or plant extracts, by boiling or other techniques, especially by enzymatic cleavage processes. Due to its high sugar content, it has a long storage life even without cooling. “Syrup” within the meaning of the present invention includes, inter alia, glucose syrup, fructose syrup and maltitol syrup. “Syrup” within the meaning of the present invention explicitly does not include syrupy substances, such as maple syrup and honey.

The terms “syrup containing a sugar substitute” and “sugar substitute syrup” are used interchangeably in the following. They refer to a syrup which is either itself a sugar substitute (such as maltitol syrup) and/or contains a sugar substitute (such as isomalt syrup or maltitol syrup).

In the context of the present invention, a “hexose syrup” is a syrup that contains hexose sugars (monosaccharides or oligosaccharides) as a main component. Preferably, these are glucose syrup or fructose syrup or a mixture of these two syrups. Glucose syrup is even more preferred. If the base material according to the invention is to be suitable for a dietetic food or fodder, the syrup is preferably maltitol syrup or isomalt syrup.

“Glucose syrup” is a concentrated solution obtained from starch by enzymatic cleavage that contains a mixture of different monosaccharides and oligosaccharides. One of their main components is glucose (grape sugar). In addition to glucose monosaccharide, glucose syrup frequently also contains high proportions of maltose, maltotriose and oligosaccharides (e.g. Grafschafter Glukosesirup 43° or 45°). Glucose syrup is predominantly used in industrial food production for sweetening foods and beverages. Thus, this syrup is one of the most important products of starch industry. By the enzymatic cleavage of starch, sweet sugars can be obtained not only from sugar cane and sugar beets, but also from more economic crops, such as corn, potatoes and wheat, which is done on an industrial scale today in the process of starch hydrolysis. Many foods, such as candies, cannot be prepared without an addition of glucose syrup. This is because glucose syrup prevents the crystallization of beet sugar (saccharose) during the preparation of hard candies, prolongs the fresh-keeping of soft candies, fondant, gummy and foam sugar articles, is an ingredient of non-alcoholic refreshments, liqueurs, ices, jams, fruit jellies, is employed as a sweetening and browning agent for bakery products, and is contained in muesli, salad dressings and fruit powders. Glucose syrup has a neutral to sweet taste and is highly soluble in water.

"Fructose syrup" is a clear, light-colored syrup that has an unpleasantly intensive sweet taste and whose sugar content (usually 70% by weight) is at least 90%, mostly at least 95%, fructose (balance: usually glucose).

"Maltitol syrup" (E 965 (ii)) consists of maltitol, sorbitol and hardened glucose syrup. Isomalt syrup consists of isomalt (E 953) and water and is usually prepared by boiling isomalt in water. Both kinds of syrup are sugar substitutes (food sweetening agents) and are used for the preparation of dietetic foods or fodders. In particular, maltitol syrup serves as a food additive for juices, marzipan and chewing gum. Isomalt is preferably used in desserts, ice and sweets.

Lecithin (chemical designation: phosphatidyl choline) in its commercial form is usually a powder. It is used in the food, pharmaceutical and cosmetics industry as an emulsifier for the stabilization of fat-in-water mixtures.

In the context of the present application, "homogeneous composition" means that all the components of a mixture are uniformly distributed in such mixture. Thus, a homogeneous composition within this meaning may also have heterogeneous components, i.e., may be, for example, a suspension or mixture of syrup and particles of different sizes.

A "conventional flour" (also referred to as "flour" in the following) is not a starch flour (powder), but a classical cereal flour, such as wheat or rye flour. Flour is made by grinding cereal grains. It consists of starch, protein (for wheat flour: gluten), cellulose (roughage) and water.

DETAILED DESCRIPTION OF THE INVENTION

The base material according to the present invention "essentially" consists of the powder (i) and the syrup (ii) as defined above in embodiment (1). "Essentially" means that the base material does not contain any substantial amounts of further components in addition to the two components mentioned. The proportion of other components is at most 1%, preferably at most 0.5%. Further components may be any materials used for foods or fodders. However, fats, oils or other lipid-containing components should not be among such further components, if possible. Rather, the further components are preferably functional components that confer a special appearance, a special smell and/or a special taste to the material, i.e., they are preferably flavors including perfumes and flavor additives and/or colorants. Most preferably, the base material according to embodiment (1) exclusively consists of the powder (thickening agent and/or lecithin powder) and the syrup, i.e., does not contain any other components at all. Both the powder employed and the syrup employed may be a mixture of several kinds of powder and syrup. However, the use of only one kind of starch (e.g., only starch flour, and preferably only one kind of starch, especially corn starch) and only one kind of syrup (preferably only glucose syrup) in the base material according to the invention is preferred.

The weight ratio of powder to syrup in the mixture of embodiment (1) is preferably from 1:0.2 to 1:2, more preferably from 1:0.4 to 1:2, even more preferably from 1:0.6 to 1:1.5. Based on 100 g of powder, this means a fraction of preferably from 20 g to 200 g of syrup, more preferably from 40 g to 200 g of syrup, even more preferably from 60 g to 150 g of syrup. In particular, a mixture of 100 g of powder plus 80 g of syrup is highly suitable as a base composition for further uses and therefore most preferred.

In a preferred aspect of embodiment (1), the powder is a starch flour, preferably corn starch, potato starch, wheat starch, rice starch or soybean starch. In this preferred aspect, the syrup is also preferably glucose syrup. The latter combination (glucose syrup plus starch flour) has the advantage that it is immediately ready for consumption and can be consumed in a cold state.

If the powder is lecithin, the syrup is preferably glucose and/or fructose syrup.

In another preferred aspect of embodiment (1), if the powder is neither starch flour nor lecithin, but a different one of the above mentioned thickening agents, the combination of such powder with glucose and/or fructose syrup or another syrup as defined above is preferred.

If the powder is a mixture of several thickening agents or a mixture of one or more thickening agents with lecithin powder, it is preferred that starch flour is the main component of the mixture (i.e., its proportion is above 50% by weight, preferably above 80% by weight, more preferably above 95% by weight of the mixture). Such mixtures are suitable, in particular, for the preparation of bakery products, mainly sweet bakery products, such as cakes (cf. Example 6).

In another preferred aspect of embodiment (1), the syrup is a hexose syrup, preferably glucose or fructose syrup or a mixture of these two kinds of syrup, more preferably glucose syrup. The latter is capable of binding all starch flours mentioned including soybean flour, thickening agents and lecithin If the syrup is fructose syrup, the powder is preferably not starch flour, but one of the thickening agents mentioned above or lecithin.

Of all sugar-containing kinds of syrup, glucose syrup is most preferred for the present invention.

In still another preferred aspect of embodiment (1), the syrup is a sugar substitute syrup, for this renders the base material dietetic in nature. If the syrup is a sugar substitute syrup, then isomalt syrup and maltitol syrup are most preferred. In this case, the powder is preferably starch flour.

The use of a sugar substitute syrup in the base material according to the invention offers itself, in particular, in cases where the base material is to be used for dietetic products, especially for dietetic foods or fodders.

The following aspects of embodiment (1) are even more preferred: starch flour with glucose syrup, lecithin powder with glucose syrup, a mixture of starch flour lecithin and one or more further thickening agents with glucose syrup and guar gum with fructose syrup. Starch flour with glucose syrup is most preferred.

In the syrup of embodiment (1), the fraction of dry matter is preferably from 65 to 85%, more preferably from 70 to 80%. This dry matter is essentially composed of sugars and/or sugar substitutes. Thus, glucose syrup usually contains from 79 to 82% of dry matter, which in turn consists of 15 to 190% of glucose, 11.5 to 15.5% of maltose, 11 to 14% of trioses and 51 to 62.5% of oligosaccharides/polysaccharides. In maltitol syrup, usually at least 500%, preferably at least 70%, of the dry matter is maltitol. Even more preferably, commercially available syrups are used for the base material (cf. Examples).

The material according to embodiment (1) is a homogeneous mass. It may have any consistency from completely solid, deformable, paste-like to liquid. The degree of hardness can be adjusted, namely through the selected ratio of powder to syrup (cf. Examples 1 and 2). In a preferred aspect, the material is solid, but deformable, i.e., it has about the consistency of modeling clay or raw marzipan. In another preferred aspect, the material is flowable, preferably having a syrupy to high viscous consistency. The present application also relates to solid, rigid compositions, granular powders (cf. Example 8) or granules (cf. Example 2) of the base material according to the invention.

If the material according to embodiment (1) is solid, but deformable, it can be converted to any three-dimensional shapes by mechanical deformation (by machine or manually). Such shapes include, inter alia, flakes, pellets, granules, tabs, crumbs, powders, slabs, plates, sheets and films. The preparation of such shapes is effected with known methods, such as rolling, pressing, punching, cutting, drawing, extruding, use of blocks etc. The shapes mentioned facilitate the shipping, storage and dosing of the material. This is also an advantage over the individual components of the material, because only blocks of the material, for example, must be wrapped in foil now instead of a syrup and a powder. This saves packaging material, shipping and storage space and simplifies the packaging in small amounts.

However, the material may also be shaped into complex three-dimensional figures, such as decorative figures. In such cases, the preparation of the figures is preferably effected manually of by means of blocks or cookie cutters.

In another preferred aspect, the base material is a highly viscous mass or paste. This shape is also more easily handled as compared to the individual components of the material, saves packaging material and facilitates division into portions. Finally, another preferred aspect is the base material in the form of granules or a similar granular shape. In this form, it can be easily filled, divided into portions and dosed.

In summary: In each consistency according to the invention that can be achieved by the composition of the base material according to the invention, the material according to embodiment (1) is easily handled, dosed and divided into portions. In particular, it is handled more easily as compared to its starting materials powder and syrup because these must be stored, filled, divided into portions and shipped separately. More particularly, this holds for a base material containing isomalt syrup as a syrup, because isomalt syrup must be prepared by boiling with water and must not cool down below 70° C. again after the isomalt has dissolved, because otherwise the syrup would congeal, and the isomalt would crystallize out. Therefore, for shipping and storing isomalt syrup, heated tank cars and heated silos must be used, which means a considerable expenditure of energy and complicated technical equipment. In addition, the storage life of isomalt syrup is limited to a few days. In contrast, the base material according to the invention comprising isomalt syrup is easily handled (powder or viscous mass), easily shipped and has a long storage life at room temperature (cf. Example 8).

In a preferred aspect, the material according to the invention is water-soluble, odorless and/or tasteless. More preferably, it is water-soluble. In another preferred aspect, it is resistant to heat and cold, preferably towards temperatures of from minus 50° C. to plus 300° C., more preferably towards temperatures of from 0° C. to 150° C.

Preferably, the material according to embodiment (1) will not segregate into its components even after a long period of standing, i.e., has a long storage life. This is true, in particular, if the syrup in the base material is glucose syrup or isomalt syrup. The storage life is more preferably at least three months, even more preferably at least 6 months. In a preferred aspect of embodiment (1), the base material according to the invention is suitable for storage at room temperature (about 18 to 28° C.). When stored in the kitchen and with the related atmospheric humidity during cooking or baking, no decomposition can be seen even after a storage period of more than 5 months (Example 4). Thus, in a mixture of starch flour and glucose syrup in a weight ratio of 1:0.8, prepared on Oct. 14, 2005 and stored in an experimental kitchen under ambient climate and with access of ambient air, no change of the externally visible and palpable structure and the processability had been observed by the filing date of the present application (Example 4).

In addition, the material according to embodiment (1) is characterized by a long storage life as compared to products containing crystal sugar and water.

In another preferred aspect, the base material according to embodiment (1) is suitable for consumption. Thus, it need not be further heated or otherwise processed before consumption, as is actually usual for starch-containing foods and fodders. This saves process steps and energy. More preferably, the base material which is ready for consumption consists of glucose syrup and starch flour or lecithin powder, even more preferably of glucose syrup and starch flour. If the base material which is ready for consumption is to be dietetic in nature, the syrup is preferably maltitol syrup or isomalt syrup, and more preferably, the base material consists of one of these two syrups and starch flour.

In a preferred aspect of embodiment (1), the base material contains another functional component in a proportion of from 0 to 1.00% by weight, preferably from 0 to 0.5% by weight, in addition to the powder and the syrup. This corresponds at most to some drops of a liquid flavor or colorant per 100 g of base material. Such functional components confer a specific appearance, a specific smell and/or a specific taste to the material, i.e., they are preferably flavors including perfumes and flavor additives and/or colorants. Thus, in this aspect, the material according to the invention is suitable as a base material for foods with a wide variety of flavors, but may also be itself a finished food of a particular flavor and appearance (e.g., a candy). Thus, the material according to the invention may obtain a chocolate-like, sweet, sour etc. taste merely by the addition of flavors or perfumes (cf. Example 4).

According to embodiment (2), the material according to the invention may be used in a wide variety of finished products. In one aspect, it can be employed without limitation and without difficulty in connection with or as a component of foods and fodders, because it is biodegradable, readily digestible by humans and animals, miscible and compatible with most other foods and fodders. Moreover, it is immediately suitable for consumption if it consists of glucose syrup and starch flour and/or lecithin powder. Additional ingredients for such a use of all conceivable kinds of food components or fodder components.

In the use according to embodiment (2), the material according to the invention is admixed with the further components of the desired final products, incorporated in the final products or applied to the final products (e.g., as a frosting or as a coat in the way of marzipan).

For use in foods:

Further components of the final products may be all usual components of foods, in principle, especially liquids, perfumes, colorants, foods, food components and nutrients. The use together with medicinal substances, drug components and pharmaceutically or cosmetically active substances for producing pharmaceuticals or cosmetics is also possible. Preferably, the use according to the invention of the base material is for producing products taken up orally, i.e., foods and food supplements and orally administered pharmaceuticals, and their precursors.

The use of the base material for producing foods and their precursors is even more preferred, especially for the preparation of sweets, soups and bakery products.

In particular, by kneading the base material with fats (such as butter, cocoa butter and margarine), oils, glycerol, tartaric and/or citric acids, spices, herbs, sugar, salt cocoa, alcohol flavors, other flavors and/or oil seeds (such as sesame, linseed, poppy, sunflower seeds), products that are immediately ready for consumption or ready for use can be prepared. In this way, energy bars can be prepared, for example.

This also applies to the kneading of the base material with ground or otherwise comminuted oil seeds (including almonds, nut kernels, apricot, peach, plum and other stone fruit kernels), grated coconut, dried fruit, especially for the preparation of muesli or muesli-based products, such as muesli bars.

The material according to the invention is especially suitable for the preparation of soups and soup concentrates: in this case, the amount of base material or of a soup concentrate containing the base material is selected depending on the desired viscidity and thickness of the finished soup. Preferably, from 20 to 70 g, more preferably, from 30 to 50 g of the base material per liter of finished soup is used. If a concentrated instant soup is to be prepared, this is done by incorporating the further ingredients into the base material without boiling up. Such instant soups can be stored for weeks without adding preservatives, even when stored openly at room temperature (cf. Example 4).

Further, the base material is suitable for the preparation of custards, frostings, marzipane substitute, bakery products, beverages etc. (cf. Examples 4 and 6).

In many compositions, the base material is kneadable and formable. Therefore, it is excellently suitable as (soft) candy, as a substitute for marzipan paste, for the preparation of three-dimensional shapes, such as figures, spheres, bars, for rolling, punching, cutting and for coating three-dimensional objects, such as bakery products or chocolates. Especially in this use, the material according to the invention has the advantage of being less expensive and having a simpler preparation as compared to many of the materials previously used for this purpose (such as marzipan or fondant).

Since the components of the material according to the invention are base components of numerous foods, it is suitable for the preparation of all those foods which usually contain such components. This also includes the preparation of such foods for the preparation of which crystal sugar has usually been used previously instead of a syrup. Thus, possible applications range from the preparation of beverages to the preparation of solid foods, such as sweets, instant soups and bakery products. More preferably, the material according to the invention can be employed in sweets, bakery products, beverages and soups, especially in instant soups and soup concentrates, custard, carbonated soft drinks and fruit beverages, malt coffee and other coffee-like beverages, candies, table figures, frostings, fondant substitute, marzipan paste substitute, glaze, sweet bakery products, mainly cakes, filling masses for sweets and bakery products (such as creams, nut fillings) etc.

Further, the base material is also suitable for the preparation of non-sweet or savoury foods beside the preparation of soups as already mentioned, especially for the preparation of starch-containing foods, such as sauces, soybean products, seasonings, savory bakery products, such as bread, buns, party cookies, spice cakes etc.

For use in fodders:

Further components of the final products may be all usual components of fodders, in principle, especially liquids, fodders (such as high-moisture fodder, green fodder, coarse fodder, high-roughage fodder), fodder components and fodder supplements (vitamins, minerals, trace elements). The use of veterinary drugs with the base material according to the invention for the preparation of veterinary medicaments is also possible. Fodders can be prepared preferably by mixing the base material according to the invention with vegetables, fruits, cereals or rice with or without the addition of meat or fish. Any parts of vegetables, fruits, cereals, meat or fish can be used including vegetable sheets, cereal husks, shells, bowels. The utilization of vegetable, fruit, cereal, meat or fish scraps is also possible in this way.

Preferably, the use according to the invention of the base material is for producing products taken up through the mouth of the animal, i.e., fodders and fodder supplements as well as orally administered veterinary medicaments and their precurors.

In principle, the base material can be employed as an independent fodder or as a component of some fodder (cf. Example 9). Preferred are those fodders in which a high carbohydrate proportion, especially a high starch proportion, is desirable, i.e., especially concentrated feeds, fodder additives and starch-containing fodders.

Due to its high density and good formability, the base material is especially suitable for the preparation of pellets.

For dietetic foods/fodders and dietetic food or fodder supplements, the sugar-containing syrup must merely be replaced by a sugar substitute containing syrup in the base material used for the above listed products.

One advantage of the use (2) is that such use spares the user of the material process steps, especially the individual addition of the powder and syrup. The base material can be employed in all conventional production machines (such as those of the food industry and fodder industry). Working processes are substantially simplified and/or shortened, which results in energy and personal cost savings. The base material according to the invention can also change the processing properties of the mixtures in which it is used. Thus, baking times and baking temperatures for bakery products in which the starch fraction of the base material largely or completely replaces conventional flour are significantly reduced among other things (cf. Example 6).

Thus, a preferred aspect of the use (2) is the use of the base material in food production or fodder production for reducing the number of working steps, energy cost and/or production times.

Preferably, the material according to the invention also adopts the function of other components of the final product, especially the function of preservatives and emulsifiers. In a preferred aspect, it spares the heating or cooking up, which is otherwise indispensible when starch is used in order to distribute the starch uniformly and stably in a mixture.

Another advantage is the preserving effect of the syrup. The material has a long-term preserving effect on foods and other perishable products in which it is employed, especially when the proportion of the base material according to the invention in the finished product is at least 40% by weight, preferably at least 60% by weight, more preferably at least 80% by weight. Thus, the soup described in Example 4 shows the first mold stains only after about 1 month of standing time with access of air.

In bakery products, especially in cakes, the base material according to the invention can be used to replace conventional flour largely to completely by starch flour. Preferably, at least 60% by weight of the flour, more preferably at least 80% by weight, even more preferably at least 90% by weight of the flour contained in a bakery product prepared by a conventional recipe is replaced by starch flour. Most preferably, the entire flour is replaced by the starch flour contained in the base material according to the invention. Lower baking temperatures and/or shorter baking times as well as advantageous properties of the thus obtained bakery product are the result. When guar gum or other thickening agents employed for avoiding desiccation and for increasing the softness and viscosity are used in the base material employed, other emollients, such as sorbitol, can even be dispensed with. Particularly preferred for bakery products is the use of the above defined mixture as a powder component of the base material.

A marzipan substitute mass prepared from the base material and bitter almond flavor (preferably some drops for 200 g of base material) has a storage life of at least 5 months. It shows no tendency to crystallize out and is safe for health.

In a preferred aspect, the base material according to embodiment (1) itself has a storage life of at least 1 year, more preferably at least 2 years. This holds, in particular, for the consumable mixture of glucose syrup and starch flour.

Another advantage of the material according to the invention in the use (2) is that flavors or other volatile substances will volatilize from the final product very slowly or not at all, because a separation or change of flavors, flavor additives, colorants or perfumes from the material during storage is hardly possible due to the preservative effect mentioned above. Thus, the smell and flavors in a solid base material consisting of starch flour and glucose syrup containing at most 2% by weight of flavors, especially at most 1% by weight of flavors, were completely preserved when it was broken up (Example 4).

On the other hand, the material according to the invention hardly absorbs any foreign smells that act on the material during storage and shipping. But even if this should be the case, such smells will volatilize during the processing while the flavors incorporated into the base material from the beginning and the inherent taste of the base material are always preserved.

Another use (2) of the material according to the invention is its use as a food supplement or substitute, or as a component of such an agent, such as fitness food, astronaut food or hospital food. Also in emergency supply (e.g. in famines or natural disasters), the material can be advantageously employed, because it can be easily stored, handled and shipped even under extreme conditions, and because it is also immediately ready for consumption if it consists of glucose syrup and starch or lecithin.

In another preferred aspect of (2), the material according to the invention is used in pharmaceuticals and cosmetics. In particular, it is suitable for the formulation of medicaments in a solid, paste-like or liquid form, as a component of tablet coats, of compressed articles (lozenges or tablets), tabs, pellets, granules and medicinal syrups.

The same applies, mutatis mutandis, to the use of the base material according to the invention in embodiment (2) as a food supplement and in veterinary medicaments.

If the powder in the base material is or contains a thickening agent other than starch flour in the use (2), the use (2) is preferably effected by further processing steps that require heating of the mixture at least once, because such thickening agents display the effect desired in their use, namely an increase in viscosity, only when heated.

The preparation of the material of the invention according to embodiment (3) is effected by combining and mixing the powder and the syrup until a homogeneous composition has formed. Preferably, this is achieved by kneading. The mixing can be done manually (kneading or stirring), but is advantageously with suitable equipment, such as kneading or mixing machines, in industrial production. Depensing on the design of the equipment, the mixing will take from about 10 to 60 min, mostly from 20 to 30 min. The mixing is further preferably effected at room temperature.

An important advantage of preparation (3) is that the mixing is successful at room temperature, i.e., at a temperature in which the powder, especially the starch, will not dissolve in water and does not form a stable suspension with water either. This opens completely new field of application and applications for the use of the powder, especially of starch flour, namely its use in concentrations and compositions in which the powder could not be employed do date due to its intrinsic properties. Thus, when the material according to the invention is used for producing bakery products, the starch can replace the flour largely or completely. To date, this has been refused by the doctrine, because excess starch rendered the bakery products dry (Büskens, H., Backschule, ISBN 37736 2252 X, 3rd Ed., 1972, p. 173).

The product according to embodiment (4) is a food, food supplement, food precursor, fodder, fodder supplement, fodder precursor, pharmaceutical, pharmaceutical precursor, veterinary medicament, veterinary medicament precursor, cosmetic or cosmetic precursor. In a preferred aspect, it consists of at least 60% by weight, more preferably at least 80% by weight, of the base material, more preferably at least 90% by weight. A base material fraction of at least 95% by weight is even more preferred.

Further preferred is a product according to embodiment (4), wherein said base material consists of glucose syrup and starch flour, preferably corn starch. Also preferred is a dietetic product according to embodiment (4), wherein said base material consists of sugar substitute syrup and starch flour, preferably corn starch. The product according to embodiment (4) is further preferably a food or food precursor or a secondary product of product (4).

The mentioned secondary product of product (4) includes all secondary products that can be prepared from the above defined product (4) or from the entirety of its ingredients by the action of physical forces, such as heat (baking, cooking etc.), supply of energy (micowaves, IR and UV radiation etc.) and mechanical forces (deformation, mixing etc.). This includes, for example, ready baked bakery products, heated frostings etc. Within the scope of the present invention, such secondary products are included in the term of food.

Particularly preferred foods and food precursors within the meaning of the present invention are:

- a marzipan substitute mass preferably containing only from 0 to 2% by weight, more preferably from 0 to 1% by weight, of bitter almond flavor in addition to the base material consisting of powder and syrup according to the invention. This marzipan substitute mass is less expensive than conventional marzipan, cannot be distinguished from marzipan by either smell or taste, has a long storage life (among other things, no crystallization of sugar) and is more easily to handle and to process further as compared to marzipan;
- a base material for sweets preferably containing only from 0 to 2% by weight, more preferably from 0 to 1% by weight, of a flavor typical of sweets in addition to the base material consisting of powder and syrup according to the invention. Such flavors typical of sweets are among others chocolate, cocoa, vanilla, caramel, lemon, rum and/or butter vanilla. This base material for sweets is preferably viscous to solid, but deformable. It is suitable for the preparation of caramels and candies, but also of custards, creams, frostings, fondant etc. In the preparation of custard from this base material for sweets, a particular advantage is that the custard is not covered by a skin, does not scorch and is ready for consumption already in a hot state. In addition, it has a long storage life;
- a sweet, preferably a caramel or candy. Such sweets either consist only of the above stated base material for sweets, or they are prepared by mixing with other sweets ingredients (such as candy mass). Caramels according to the invention preferably contain only flavors, flavor carriers (such as cocoa) and/or caramel in addition to the base material. The sweets according to the invention are more easily prepared than comparably tasting, conventionally prepared sweets, but are similar to them in smell, consistency and taste;

a frosting. This preferably consists of the base material, from 0 to 20% by weight of flavors and/or colorants and a few percent of water. In chocolate coatings, it additionally contains up to a maximum of 100% by weight of fat. The frosting according to the invention has a durable glossy appearance, is not sticky, does not crystallize out and is suitable for cutting conventional sugar frostings, such as fondant frosting;

a soup concentrate. In addition to the base material, it contains the typical soup components, such as herbs, spices, salt, oil, further flavor carriers and, as a second major ingredient in addition to the base material, the eponymous component (e.g., tomatoes in the form of tomato paste). This concentrate is preferably past-like to solid. In an embodiment that is particularly preferred, because it is easily dosed, it has the form of small-volume solids, i.e., takes the form of granules, a powder, pellets, flakes or the like; or a bakery product, more preferably a sweet pastry, especially a cake, or a base material for such bakery products.

In the latter case (bakery product), especially in cakes, the base material according to the invention will replace conventional flour largely to completely by starch flour. Preferably, at least 60% by weight of the flour, more preferably at least 80% by weight, even more preferably at least 900% by weight of the flour contained in a bakery product according to the conventional recipe is replaced by starch flour. Most preferably, the entire flour is replaced by the starch flour contained in the base material according to the invention. Lower baking temperatures and/or shorter baking times as well as advantageous properties (softness, fluffiness) of the thus obtained bakery product are the result. When guar gum or other thickening agents employed for avoiding desiccation and for increasing the softness and viscosity are used in the base material employed, other emollients, such as sorbitol, can even be dispensed with. Particularly preferred for bakery products is the use of the above defined mixture as a powder component of the base material.

Another advantage of the bakery product according to the invention is that conventional flour can be dispensed with. In particular, persons suffering from a cereal allergy will benefit from this fact. If a sugar substitute syrup is additionally used as a syrup component, the bakery product is also suitable for diabetics or as a dietetic food.

Although the base material according to the invention for such bakery products may contain other ingredients for the finished bakery product in addition to the base material according to the invention, it is preferably the base material according to the invention. More preferably, it contains glucose syrup as the only syrup component, and at least half, preferably at least 80% by weight, more preferably at least 90% by weight of the powder component is a starch flour. In an even more preferred embodiment, lecithin powder and/or other thickening agents are also contained in the bakery product base material in a proportion of less than 10% by weight of the powder component, in addition to glucose syrup and starch flour. These other ingredients affect the properties of a finished bakery product prepared from such base material in the same way as it would when used in conventional bakery products.

Accordingly, a base material according to the invention for dietetic bakery products preferably contains a sugar substitute syrup or a mixture of different sugar substitute syrups in stead of the glucose syrup.

The invention is illustrated by the following Examples, which are not, however, to be considered limiting to the subject matter of the invention.

EXAMPLES

Example 1

Mix with Caramel-Like Consistency, "Base Material"

At room temperature, 100 g of corn starch was kneaded with 80 g of Grafschafter® glucose syrup (referred to as "glucose syrup" in the following) with the hands until a homogeneous mass had formed. A homogeneous tough mass (referred to as "base material" in the following) was formed having a consistency similar to that of soft candies (such as Storck Riesen®). This mixture did not change its consistency for at least 6 months after its preparation, i.e., no segregation of the starch from the glucose syrup could be observed.

In further experiments, either potato, wheat or rice starch was used instead of corn starch. The result was similar to that obtained with corn starch.

Glucose syrup employed: Grafschafter glucose syrup 43°; composition according to the manufacturer:

Dry matter: 79.0-80.0%

Sugar spectrum in dry matter:

| | |
|---|---|
| Glucose (dextrose) | 15.0-19.0% |
| Maltose | 11.5-15.5% |
| Maltotriose | 11.0-14.0% |
| Oligo-/polysaccharides | 51.5-62.5% |

Example 2

Mix (A) With Syrupy Consistency

At room temperature, 100 g of starch flour was mixed with 150 g of glucose syrup to form a turbid, lumpless, highly viscous suspension. This suspension remained stable for at least 5 months after its preparation, i.e., the starch did not settle again.

(B) With Crumb-Like Consistency

At room temperature, 100 g of starch flour was mixed with 20 g of glucose syrup to form crumbs that were similar to granules and could also be dosed like granules.

In further experiments, either potato, wheat or rice starch was used instead of corn starch. The result was similar to that obtained with corn starch.

Example 3

Mix of Soybean Starch Flour or Lecithin and Glucose Syrup

At room temperature, 100 g of soybean starch flour or lecithin powder was kneaded with 80 g of glucose syrup with the hands until a homogeneous mass had formed. A homogeneous tough mass was formed having a consistency similar to that of soft candies (such as Storck Riesen®).

Example 4

Preparation and Storage Life of Foods with the Mix According to the Invention (A) Tomato Soup 180 g of the base material from Example 1 (i.e., 100 g of starch and 80 g of glucose syrup) was mixed with 70 g of tomato paste, 5 g of oregano, 5 g of herb mix, 15 g of dried fried onions, a pinch of salt and 10 spoonfuls of olive oil until a homogeneous mixture was obtained. The soup concentrate formed (a paste) was stored in an unsealed plastic bag in the kitchen at room temperature. After 4 weeks of storage, neither flavor nor smell, taste or color had been lost, and it did not show any traces of mold after this time.

From 60 g of the thus prepared soup concentrate, a tomato soup was prepared by boiling with 11 of water. It was still edible even after 5 days of standing openly at room temperature.

Tomato soup granules were also prepared. For this purpose, 100 g of corn starch with 50 g of glucose syrup was used, and all the other ingredients were the same as in the preparation of the paste. The granules had the same storage life and could be used in the same way for preparing a soup as the paste.

(B) Marzipan Substitute Mass, Table Figures

After the addition of a few drops of bitter almond flavor, the base material as under (A) could be used directly as a marzipan substitute mass. The taste and flavor of this marzipan substitute mass could not be distinguished from those of true marzipan. After more than 5 months of storage at room temperature wrapped in plastic sheet, neither flavor nor consistency had changed, and in particular, no crystallizing of sugar could be observed.

The thus formed marzipan substitute mass was also used for "cutting down" true marzipan paste. Thus, 180 g of this marzipan substitute mass was kneaded with a few drops of almond oil and either 50 or 100 g of true marzipan paste. A mass having a marzipan-like consistency was formed that could not be distinguished from true marzipan in terms of appearance, smell and taste. This mass also had a long storage life and did not show any crystallization of sugar. In addition, it was easier to handle and to further process as compared to conventional marzipan, which is allowed to contain a maximum of 3.5% of its total weight of glucose syrup.

In addition, the base material (180 g) was kneaded with Christmas spices, rolled and cut with a cookie cutter (stars, among others). It was also used for coating pastry in the form of printen.

In addition, 180 g of base material was kneaded with powdered sugar and 40 g of cocoa powder. The mass formed was easily kneaded and was used for the preparation of table figures.

(C) Custard (Dessert Pudding)

100 g of the base material was boiled up with one liter of water and additional spices (vanilla, chocolate, caramel). A custard was obtained that was ready for consumption even in a hot state. This is an advantage over conventional custards, which must be kept cold for congealing. In addition, the custard did not scorch when boild up, which means a considerable simplification the custard preparation both at home and on an industrial scale. In addition, the custard did not form a skin (unlike conventional custards). Only 8 to 10 days after its preparation, it showed the first mold stains after standing in air openly, which is clearly later as compared to conventional custards without preservatives.

(D) Frosting

In a small pot, 50 g of the base material was heated at 34° C. with some drops of water and then placed onto a glass pane. Optically, the result could not be distinguished from sugar frosting. The frosting has a durable glossy appetizing appearance, is a bit sweet, not sticky (unlike sugar frosting on rollkuchen, for example) and does not crystallize.

The frosting can be mixed with conventional sugar frosting, for example, 800-900 g of base material plus 100-200 g of fondant frosting, in order to save costs.

If only the base material is used as the frosting, the color will have changed from glossy to flat-lustrous after 4 to 5 days. However, this can be prevented by adding about 5 to 10 g (per 50 g of base material) of fat or colorants.

(E) Beverages

According to the desired viscidity, from 5 g to 20 g of base material is used per 1 liter of water. Boiling up yields a transparent liquid that can be further processed into any carbonated soft drink or any fruit-tasting beverage by the addition of corresponding flavors and colorants. Lumps that may form after 2 to 4 days of standing can be redissolved by shaking as with fruit juices.

After being opened, the beverages can be stored for at least 7 to 10 days.

(F) Bread Substitute)

From breadcrumbs and the base material, a bread-like product having a long storage life that need not be baked can be prepared without baking.

(G) Candies and Sweets 180 g of the base material was kneaded with 20 g of cocoa powder and 40 g of a traditional caramel mass. A chocolate-smelling and -tasting mass was formed that could hardly be distinguished from conventional chocolate soft candies, such as Storck® Riesen. When 60 g rather than 20 g of cocoa powder was used, the mass became more rigid and could be rolled and cut with a cookie cutter.

In another mix, 180 g of the base material, 40 g of conventional caramel mass, 50 g of ground toasted hazelnuts, 10 g of lecithin powder and two spoonfuls of walnut oil are kneaded together, then rolled, coated with chocolate hazelnut spread and shaped into balls. The product was similar to Toffifee® in taste. However, as compared to the latter, it was substantially less difficult to prepare.

Finally, 180 g of the base material, 40 g of conventional caramel mass, 0 or 50 g of ground toasted hazelnuts, 10 g of lecithin powder and 10 spoonfuls of walnut oil were kneaded together, then rolled and cut with a cookie cutter (printen figures). The same was performed on a scale enlarged to 20 kg of final product.

(H) Addition of Flavors

A few drops each of bitter almond flavor, lemon flavor, butter vanilla flavor, rum flavor, vanilla flavor or caramel flavor was added to 100 g of the base material and incorporated by kneading. After almost 6 months of storage in a plastic bag at room temperature, the thus prepared products were almost unchanged in taste and smell.

Example 5

Physical Stability of a Mixture of Starch and Glucose Syrup as Compared to a Mixture of Starch and Honey From 100 g of starch flour and 80 g of glucose syrup or honey, a uniform suspension was prepared. These mixtures were allowed to stand at room temperature. In the mixture with honey, a fermentation quickly started, so that the mass fell apart when touched after three days already as a result of alcohol formation. In contrast, in the mixture with glucose syrup, the starch remained uniformly distributed for more than 5 months (cf. Example 1), and fermentation did not occur either.

Example 6

"Rodonkuchen" Deep-Dish Cake in which the Flour Fraction has been Completely Replaced by Starch 15 g of guar gum, 15 g of tara gum, 10 g of lecithin powder, 620 g of corn starch and 720 g of glucose syrup were kneaded together ("base material") and subsequently processed with 250 g of margarine, 300 g of sugar, 6 eggs, 20 g of baking powder and 0.5 liter of milk into a dough. Thus, the corn starch replaced the conventional (wheat) flour content of usually 620 g in the dough in this recipe. The dough was filled in several cake pans and baked in a circulating air baking oven as follows: 10 min at 170° C., 15 min at 150° C., then ready-baking at 140° C. Total baking time depending on the pan size: from 30 to 45 min. For comparison: The normal baking time for a rodonkuchen of this size prepared with conventional wheat flour is from 50 to 60 min at 170 to 180° C. in a circulating air baking oven.

Example 7

Mixture of Maltitol Syrup and Starch 100 g of starch was kneaded with 80 g of maltitol syrup (Cargill, C*Maltidex L 16303) to form a homogeneous tough mass having the same mechanical properties and processing properties and the same storage life as the base material from Example 1.

Composition of the employed maltitol syrup C*Maltidex L 16303 (prepared from corn; EINECS No. 2703378, CAS No. 68425-17-2):

| | |
|---|---|
| Dry matter: | 74.3-76.2% |
| Maltitol: | 50-55% of dry matter |
| Sorbitol: | max. 8% of dry matter |

Example 8

Mixture of Isomalt Syrup and Starch 70 g of isomalt (Cargill, C*IsoMaltidex 16500) and 30 g of water was boiled up, and the thus prepared isomalt syrup was cooled down to below 50° C. and kneaded with starch in different mixing ratios (100 g of isomalt syrup for 80 g, 60 g and 50 g of starch) to form a powder. This powder was soluble in cold water or could be used directly as a powder for further processing.

The powder is easily shipped and dosed. Moreover, it has a long storage life (storage for at least 5 weeks is possible).

Example 9

Fodder Production

Dry fodder or wet fodder could be prepared by mixing one of the base materials from Example 1, 3, 7 or 8 with vegetables, fruit, cereals or rice with or without addition of meat or fish. Further, any parts of vegetables, fruit, cereals, meat or fish could be used including vegetable sheets, cereal husks, shells, bowels. The utilization of vegetable, fruit, cereal, meat or fish scraps is also possible in this way.

Thus, depending on the base material employed, normal or dietetic animal fodder is obtained.

The invention claimed is:

1. A base material comprising the following ingredients:

(i) a powder selected from a starch flour, lecithin, a mixture of several starch flours and a mixture of one or more starch flours with lecithin;

(ii) a syrup or a mixture of several syrups; and (iii) from 0 to 1.0% by weight of a functional component selected from the group consisting of flavors, perfumes, flavor additives and colorants;

wherein any ingredient besides ingredients (i)-(iii) is present in said base material in a proportion of at most 1% by weight based on the weight of the base material.

2. The base material according to claim 1, wherein said powder is a starch flour selected from corn starch, wheat starch, rice starch, soybean starch or potato starch.

3. The base material according to claim 1, wherein (i) said syrup is a hexose syrup; and/or (ii) said syrup is a syrup comprising a sugar substitute.

4. The base material according to claim 1, wherein the weight ratio between the powder and the syrup ranges from 1:0.2 to 1:2.

5. The base material according to claim 1, wherein said functional component is selected from flavors, flavor additives and colorants.

6. The base material according to claim 1, which (i) is water-soluble, odorless and/or tasteless;

(ii) is liquid, paste-like, deformable or solid;

(iii) has a long-storage life of at least three months and/or is suitable for storage at room temperature;

(iv) is temperature-resistant at from −50° C. to 300° C.; and/or (v) is suitable for consumption.

7. A process for producing the base material according to claim 1, comprising the steps of:

(i) combining the powder and the syrup to form a mixture; and (ii) mixing the mixture until a homogeneous composition is obtained.

8. A food, food supplement, food precursor, fodder, fodder supplement, fodder precursor, pharmaceutical, veterinary medicament or cosmetic consisting of at least 50% by weight of said base material according to claim 1.

9. The food, food supplement, food precursor, fodder, fodder supplement, fodder precursor, pharmaceutical, veterinary medicament or cosmetic according to claim 8, wherein said base material consists of glucose syrup and starch flour.

10. The dietetic food, food supplement, food precursor, fodder, fodder supplement or fodder precursor according to claim 8, wherein said base material consists of a syrup containing a sugar substitute and starch flour.

11. The food or food precursor according to claim 8, which is:

(i) a marzipan substitute mass;

(ii) a soup concentrate;

(iii) a sweet, (iv) a base material for sweets;

(v) a bakery product or base material for bakery products; or (vi) a frosting.

12. The food according to claim 11, which is a bakery product in which at least 60% by weight of the flour required for preparing such a bakery product has been replaced by starch flour.

13. The food precursor according to claim 11, which is a base material for bakery products, wherein the syrup is exclusively glucose syrup and at least 50% by weight of the powder is starch flour in this base material, and wherein optionally lecithin powder and/or other thickening agents are contained in this base material for bakery products in a proportion of below 10% by weight of the powder component in addition to glucose syrup and starch flour.

14. The dietetic food precursor according to claim 11, which is a base material for bakery products, wherein the syrup is exclusively a sugar substitute syrup and at least 50% by weight of the powder is starch flour in this base material, and wherein optionally lecithin powder and/or other thickening agents are contained in this base material for bakery products in a proportion of below 10% by weight of the powder component in addition to glucose syrup and starch flour.

* * * * *